(12) United States Patent
Tsang et al.

(10) Patent No.: US 8,004,119 B2
(45) Date of Patent: Aug. 23, 2011

(54) MULTI-FUNCTION THREE-PHASE ACTIVE POWER FILTER

(75) Inventors: Kai Ming Tsang, Kowloon (CN); Wai Lok Chan, Kowloon (CN)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 72 days.

(21) Appl. No.: 12/216,475

(22) Filed: Jul. 7, 2008

(65) Prior Publication Data

US 2010/0001588 A1 Jan. 7, 2010

(51) Int. Cl.
*H02J 1/02* (2006.01)
*H02M 1/12* (2006.01)
*H02M 1/14* (2006.01)

(52) U.S. Cl. .......................... 307/105; 327/52

(58) Field of Classification Search .................. 307/105; 327/52

See application file for complete search history.

(56) References Cited

U.S. PATENT DOCUMENTS

| | | | | |
|---|---|---|---|---|
| 4,969,080 A | * | 11/1990 | Kawabata et al. | 363/44 |
| 5,751,138 A | * | 5/1998 | Venkata et al. | 323/207 |
| 5,757,099 A | * | 5/1998 | Cheng et al. | 307/105 |
| 5,920,478 A | * | 7/1999 | Ekblad et al. | 700/29 |
| 6,426,602 B1 | * | 7/2002 | McCann et al. | 318/432 |
| 6,862,199 B2 | * | 3/2005 | Escobar et al. | 363/41 |
| 2004/0042557 A1 | * | 3/2004 | Kabel et al. | 375/260 |
| 2004/0072336 A1 | * | 4/2004 | Parra et al. | 435/287.2 |
| 2006/0044850 A1 | * | 3/2006 | Wu et al. | 363/41 |
| 2006/0097686 A1 | * | 5/2006 | Yasui et al. | 318/716 |
| 2008/0150470 A1 | * | 6/2008 | Yasui et al. | 318/717 |
| 2008/0208496 A1 | * | 8/2008 | Habath et al. | 702/77 |

OTHER PUBLICATIONS

English abstract of KR 2007004152 to Min, Neutral line current reduction of three-phase four-wire power system using active filter, especially for controlling increase of neutral line current due to fundamental wave and harmonic wave current generated in nonlinear load, Jan. 9, 2007.*
JP Pg-pub 2005/245122 to Fujita et al.—english translation, Sep. 8, 2005.*
Direct Space Vector PWM Strategies for Three-Phase to Three-Phase Matrix Converter, to Tadano et al., Apr. 2007.*

* cited by examiner

*Primary Examiner* — Rexford Barnie
*Assistant Examiner* — Justen Fauth (57) ABSTRACT

A new multi-function shunt active filter has been successfully implemented. The proposed decoupler and cascade controller provide a simple solution to power factor correction, reduction of harmonics loads and load balancing. The mathematical burden of resolving the load current to fundamental and harmonics is not required. The decoupler and controller can easily be implemented using low-cost analogue devices.

2 Claims, 13 Drawing Sheets

FIG. 6a)
line 1 current

FIG. 6b)
line 2 current

RMS current=1.7
Fundamental=50.0HZ
True Power=364.49

FIG. 6c)
line 3 current

Current THD=32.91%
K-Factor=8.76
True P.F.=0.95

|  | □ V1n | □ I1 | □ V2n | □ I2 | □ V3n | □ I3 |
|---|---|---|---|---|---|---|
| RMS Value: | 223.3 | 1.7 | 227.0 | 1.8 | 228.2 | 1.7 |
| Crest Factor | 1.4 | 1.7 | 1.4 | 1.6 | 1.4 | 1.8 |

Total
True Power: 1192.7
True P.F.: 0.99

FIG.7

FIG.8a) line 1 current

FIG.8b) line 2 current

RMS Current=1.7
Fundamental=50.0 Hz
True Power=393.31

Current THD=12.72%
K-Factor=6.45
True P.F=0.99

FIG.8c
line 3 current

|  | V1n | I1 | V2n | I2 | V3n | I3 | Total |
|---|---|---|---|---|---|---|---|
| RMS Value: | 222.7 | 2.2 | 226.1 | 2.1 | 227.5 | 1.6 | True Power: 1272.9 |
| Crest Factor: | 1.4 | 1.4 | 1.4 | 1.6 | 1.4 | 1.5 | True P.F.: 0.96 |

FIG.9

Fig.10a) line 1 current
RMS Current= 2.2
Fundamental=50.0 Hz
True Power=480.25
Current THD= 20.57%
K-Factor=3.89
True P.F.=0.98

Fig.10b) line 2 current
RMS Current= 2.1
Fundamental=50.0 Hz
True Power=453.90
Current THD= 22.82%
K-Factor=4.06
True P.F.=0.96

FIG.10c) line 3 current

FIG.11

FIG.12a) line 1 current

FIG.12b) line 2 current

MULTI-FUNCTION THREE-PHASE ACTIVE POWER FILTER

BACKGROUND

Electric power usage today is moving from simple linear loads to electronic loads, such as solid-state motor drives, personal computers, and energy efficient ballasts. The electric current drawn by these new devices is non-sinusoidal and causes problems in the power system. The input power factor (PF) and total harmonic distortion (THD) of these devices are normally poor.

To minimize the stresses and maximize the power handling capabilities of power systems, power factor correction (PFC) circuitry and active power filter can be added to improve the shape of the input current waveform. Currently, there are international regulations, such as IEEE 519, that limit the input harmonic content.

In addressing the stresses, and meeting international regulations, the prior art has shown the use of passive power filters, consisting of inductors and AC capacitors. The prior art has also shown the use of active power filters, such as taught in U.S. Pat. No. 6,472,775.

It is an object of the present invention to overcome the disadvantages and problems in the prior art.

DESCRIPTION

To facilitate low cost implementation, the control circuit is implemented using analogue devices. A very simple decoupling technique using pseudo inverse is used and d-q transformation is not required for the design of the controller. Simple proportional plus integral controllers can be designed based on the decoupled filter. The overall design composes of two control loops with the voltage loop outside the inner current loop and a decoupled circuit. Actually the decoupled circuit is just a summing junction. Hence the overall control circuit becomes very simple. To achieve a high power factor and low current THD, the supply currents have to be in phase with and the same shape as the supply voltage waveforms. Hence reference supply currents drawn from the supply voltages and the voltage control loop are also derived.

These and other features, aspects, and advantages of the apparatus and methods of the present invention will become better understood from the following description, appended claims, and accompanying drawings where:

FIG. 8(a-c) shows the spectra of the supply currents;

FIG. 10(a-c) shows the spectra of the load current for the unbalanced load;

FIG. 12(a-c) shows the spectra of the supply currents of the active filter.

Figure 1:
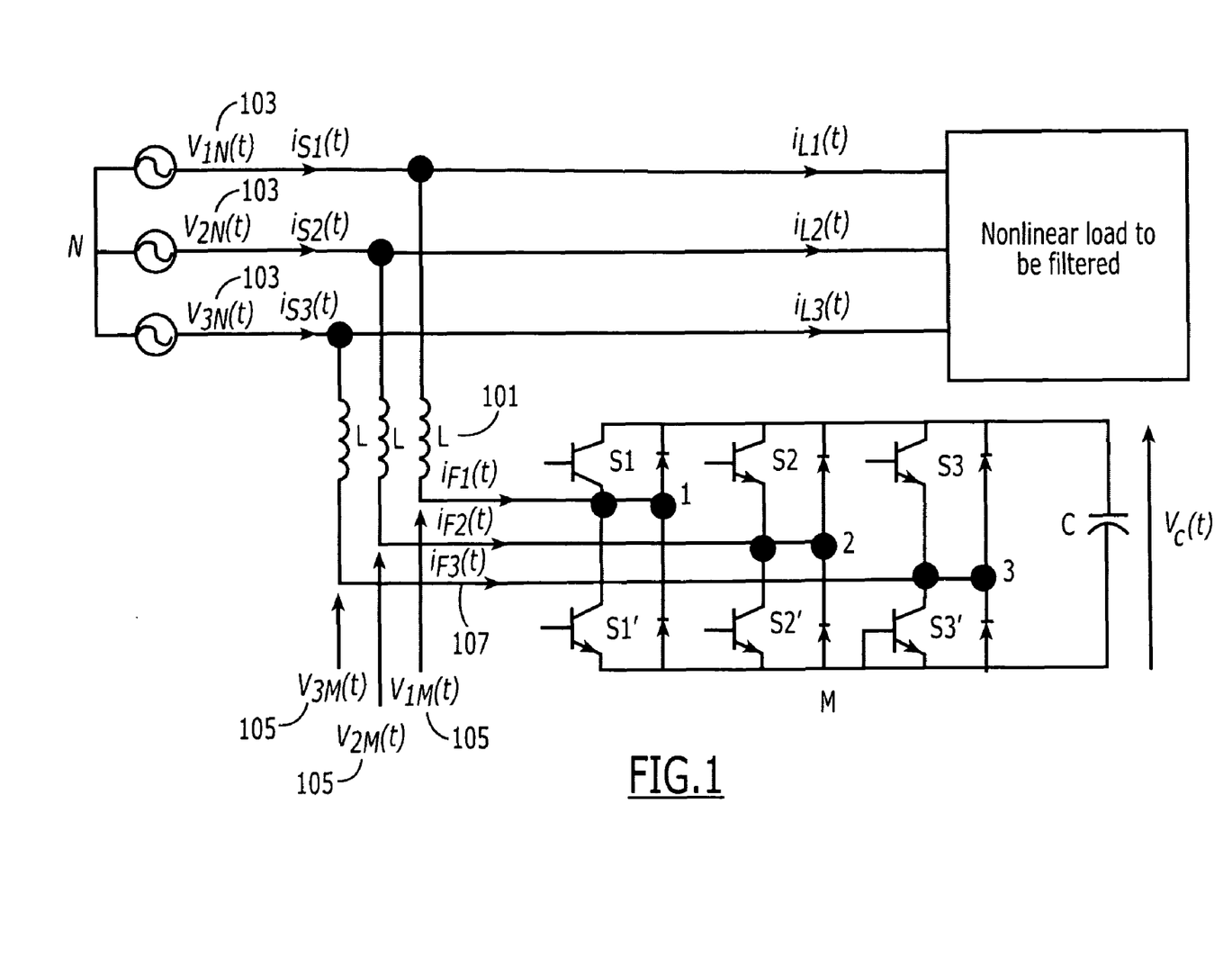
FIG. 1 is a schematic diagram for a three-phase shunt active filter in accordance with the present invention.

A schematic diagram for a three-phase shunt active filter is shown in FIG. 1. and the filter circuit can be described by the equations $$v_{1N}(t) = L\dot{i}_{F_1}(t) + v_{1M}(t) + v_{MN}(t)$$

$$v_{2N}(t) = L\dot{i}_{F_2}(t) + v_{2M}(t) + V_{MN}(t)$$

$$v_{3N}(t) = L\dot{i}_{F_3}(t) + v_{3M}(t) + v_{MN}(t) \quad (1)$$

where L 101 is the filter inductance, $v_{1N}(t)$, $v_{2N}(t)$ and $v_{3N}(t)$ 103 are the phase voltages, $v_{1M}(t)$, $v_{2M}(t)$ and $v_{3M}(t)$ 105 are the voltages between point 1 and M, point 2 and M, and point 3 and M, $v_{MN}(t)$ is the voltage between point M and N, and $i_{F_1}(t), i_{F_2}(t)$ and $i_{F_3}(t)$ 107 are the filter inductor current, respectively. Assuming that the AC supply voltages are balanced, adding the three equations in (1) and taking into account the sum of filter currents is zero for a three-wire system produces the following relationship $$v_{MN}(t) = -\frac{1}{3}(v_{1M}(t) + v_{2M}(t) + v_{3M}(t)) \quad (2)$$

The voltages $v_{1M}(t)$, $v_{2M}(t)$ and $v_{3M}(t)$ are governed by the switching functions $c_k$, $k=1,2,3$ of the k-th leg of the converter and the switching function is defined as $$c_k = \begin{cases} 1 & \text{if } S_k \text{ is on } S'_k \text{ is off} \\ 0 & \text{if } S_k \text{ is off and } S'_k \text{ is on} \end{cases} \quad (3)$$

Substituting (3) and (2) to (1) gives $$v_{1N}(t) = L\dot{i}_{F_1}(t) + \left(\frac{2}{3}c_1 - \frac{1}{3}c_2 - \frac{1}{3}c_3\right)v_c(t) \quad (4)$$

$$v_{2N}(t) = L\dot{i}_{F_2}(t) + \left(-\frac{1}{3}c_1 + \frac{2}{3}c_2 - \frac{1}{3}c_3\right)v_c(t)$$

$$v_{3N}(t) = L\dot{i}_{F_3}(t) + \left(-\frac{1}{3}c_1 - \frac{1}{3}c_2 + \frac{2}{3}c_3\right)v_c(t)$$

where $v_c(t)$ is the DC busbar voltage. If fixed switching frequency is selected, the state-average model of the filter can be described as $$v_{1N}(t) = L\dot{i}_{F_1}(t) + \left(\frac{2}{3}d_1(t) - \frac{1}{3}d_2(t) - \frac{1}{3}d_3(t)\right)v_c(t) \quad (5)$$

$$v_{2N}(t) = L\dot{i}_{F_2}(t) + \left(-\frac{1}{3}d_1(t) + \frac{2}{3}d_2(t) - \frac{1}{3}d_3(t)\right)v_c(t)$$

$$v_{3N}(t) = L\dot{i}_{F_3}(t) + \left(-\frac{1}{3}d_1(t) - \frac{1}{3}d_2(t) + \frac{2}{3}d_3(t)\right)v_c(t)$$

where $d_1(t)$, $d_2(t)$ and $d_3(t)$ are the duty ratios for the three switching legs. Setting $u_1(t)=d_1(t)-0.5$, $u_2(t)=d_2(t)-0.5$ and $u_3(t)=d_3(t)-0.5$, the average DC current running into the capacitor C is given by $$i_{DC}(t) = 2(u_1(t)i_{F_1}(t) + u_2(t)i_{F_2}(t) + u_3(t)i_{F_3}(t)) \quad (6)$$

and the average dynamics of the DC busbar voltage is governed by $$C\dot{v}_c(t) = i_{DC}(t) = 2(u_1(t)i_{F_1}(t) + u_2(t)i_{F_2}(t) + u_3(t)i_{F_3}(t)) \quad (7)$$

From (5) and (7), the shunt active filter can be decomposed into a voltage control loop and a current control loop. For a three wire system, the sum of filter currents is zero and the characteristic of the filter system can be described by any two equations from (5) because the third equation can be determined from the selected two equations. Taking the first two equations of (5) to describe the filter characteristics, (5) can be re-written as $$L\dot{i}_{F_1}(t) = -\left(\frac{2}{3}u_1(t) - \frac{1}{3}u_2(t) - \frac{1}{3}u_3(t)\right)v_c(t) + v_{1N}(t) \quad (8)$$

$$L\dot{i}_{F_2}(t) = -\left(-\frac{1}{3}u_1(t) + \frac{2}{3}u_2(t) - \frac{1}{3}u_3(t)\right)v_c(t) + v_{2N}(t)$$

If the DC busbar voltage $v_c(t)$ is assumed to be well regulated at $U_c$, the current dynamics of (8) can be approximated as $$\begin{bmatrix} L\dot{i}_{F_1}(t) \\ L\dot{i}_{F_2}(t) \end{bmatrix} = A \begin{bmatrix} u_1(t) \\ u_2(t) \\ u_3(t) \end{bmatrix} + \begin{bmatrix} v_{1N}(t) \\ v_{2N}(t) \end{bmatrix} \quad (9)$$

$$A = \begin{bmatrix} -\frac{2U_c}{3} & \frac{U_c}{3} & \frac{U_c}{3} \\ \frac{U_c}{3} & -\frac{2U_c}{3} & \frac{U_c}{3} \end{bmatrix}$$

Figure 2:
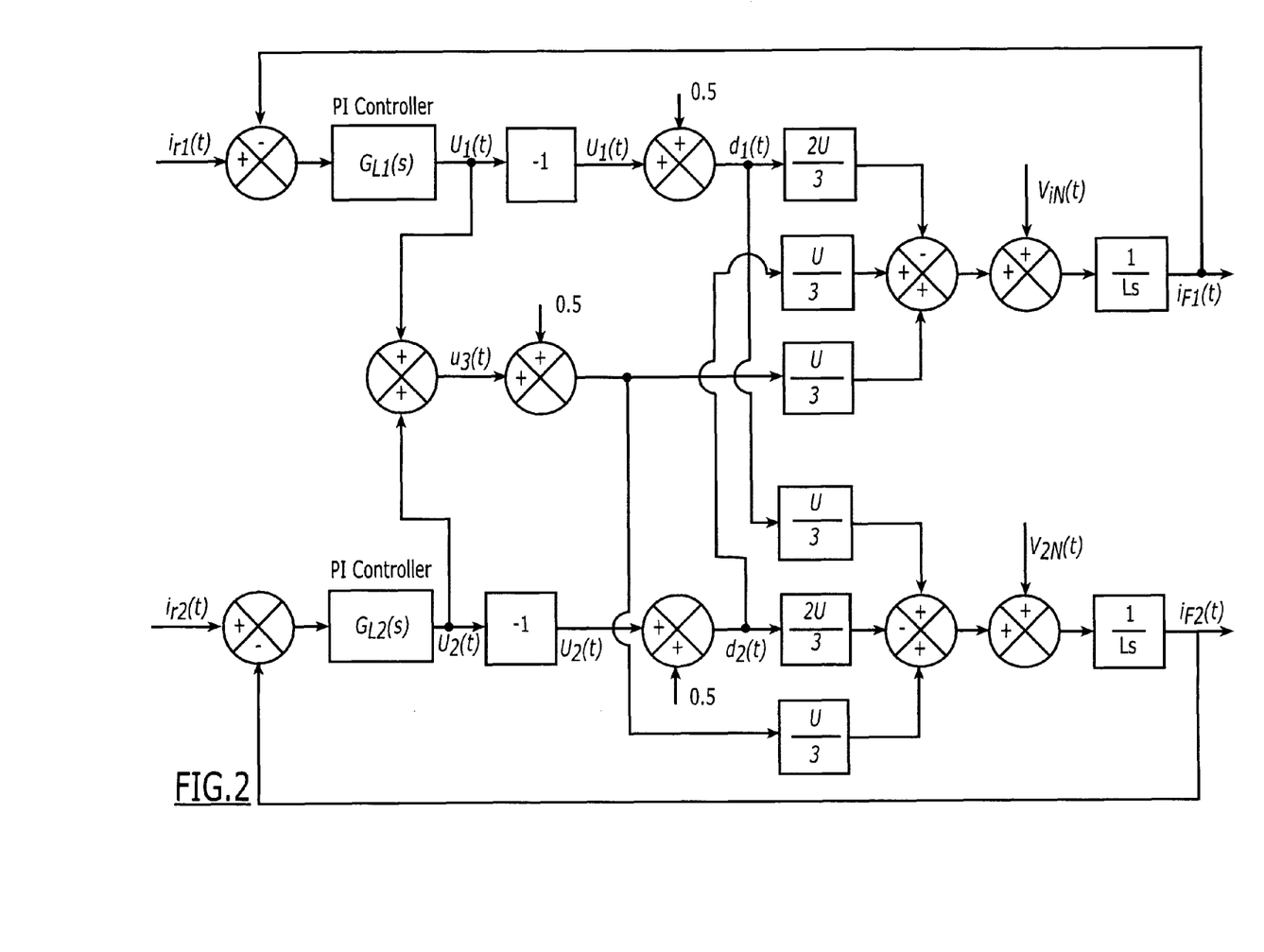
FIG. 2 is a block diagram representation of the current control loop with the decoupler where $ir_1(t)$ and $ir_2(t)$ are the reference filter currents.

In order to design controller for the current loop, the system has to be first decoupled. A simple way to decouple (9) is to multiply the matrix A with its pseudo inverse which is given by $$A_i = \begin{bmatrix} -1 & 0 \\ 0 & -1 \\ 1 & 1 \end{bmatrix} \quad (10)$$

and a block diagram representation of the current control loop with the decoupler included is shown in FIG. 2 where $i_{r_1}(t)$ and $i_{r_2}(t)$ are the reference filter currents that will be generated by the difference between the primary voltage loop multipliers output and the load currents $i_{L_1}(t)$ and $i_{L_2}(t)$ respectively. With (10) added, (9) becomes $$\begin{bmatrix} L\dot{i}_{F_1}(t) \\ L\dot{i}_{F_2}(t) \end{bmatrix} = \begin{bmatrix} U_c & 0 \\ 0 & U_c \end{bmatrix} \begin{bmatrix} U_1(t) \\ U_2(t) \end{bmatrix} + \begin{bmatrix} v_{1N}(t) \\ v_{2N}(t) \end{bmatrix} \quad (11)$$

$$u_1(t) = -U_1(t), u_2(t) = -U_2(t), u_3(t) = U_1(t) + U_2(t)$$

where $U_1(t)$ and $U_2(t)$ are the outputs from the two current loop PI controllers and the actual duty ratios for the three switching legs can be recovered as $$d_1(t) = u_1(t) + 0.5$$

$$d_2(t) = u_2(t) + 0.5$$

$$d_3(t) = u_3(t) + 0.5$$

and $|u_i(t)| < 0.5$, $i = 1, 2, 3$. With the added decoupler, the two filter currents can be regarded as two independent variables and an independent controller can be designed for each of the filter variables. Take the filter current $i_{F_1}(t)$ as an example, the purpose of including a PI controller within the control loop is to reduce the effect of the line voltage $v_{1N}(t)$ on the output filter current and to force the filter current to track the reference filter current $i_{r_1}(t)$.

If the added PI controller takes the form $$G_{L_1}(s) = \frac{K_{P_1}s + K_{I_1}}{s} \quad (12)$$

where $K_{P_1}$ and $K_{I_1}$ are constants, the output filter current becomes $$I_{F_1}(s) = \quad (13)$$

$$\frac{U_c(K_{P_1}s + K_{I_1})}{Ls^2 + K_{P_1}U_cs + K_{I_1}U_c}I_{r_1}(s) + \frac{s}{Ls^2 + K_{P_1}U_cs + K_{I_1}U_c}V_{1N}(s)$$

where s is the Laplace variable, $I_{F_1}(s)$, $I_{r_1}(s)$ and $V_{1N}(s)$ are the Laplace transform of the filter current $i_{F_1}(s)$, $i_{r_1}(s)$ and the line voltage $v_{1N}(t)$, respectively. From (13), the settings of $K_{P_1}$ and $K_{I_1}$ play an important role in the shunt active filter as they will affect the rejection of disturbances and the reference current $i_{r_1}(t)$. In actual practice, $v_c(t)$ composed of a well regulated DC component $U_c$, and small ripples. It is desirable that the line current $i_{s_1}(t)$ is in phase with the phase voltage $v_{1N}(t)$. The major concern in the current control loop is to reduce the effect of disturbances caused by the line voltage $v_{1N}(t)$ and try to track the reference current $i_{r_1}(t)$. The reference current $i_{r_1}(t)$ is derived from the supply voltage and the load current $i_{L_1}(t)$, the frequency content of the reference signal will compose of the supply frequency and its higher harmonics. In order to track the reference current, the bandwidth of the current control loop have to be set as high as possible such that the gain and phase variations of the closed-loop control process up to $50^{th}$ harmonics are small. The characteristic equation of the current loop is given by $$\Delta(s) = Ls^2 + K_{P_1}U_cs + K_{I_1}U_c$$

If the undamped natural frequency $\omega_I$ of the current loop is set to 1/m times the switching frequency of the filter such that $$\omega_I = \frac{2\pi f_s}{m} = \sqrt{\frac{K_{I_1}U_c}{L}}, m \geq 4 \quad (14)$$

where $f_s$ is the switching frequency of the filter, the required $K_{I_1}$ is thus given by $$K_{I_1} = \frac{(2\pi)^2 f_s^2 L}{m^2 U_c} \quad (15)$$

The damping ratio of the current loop is governed by $$2\zeta\omega_I = \frac{K_{P_1}U_c}{L}$$

where $\zeta$ is the damping ratio of the current loop. If the current loop is set to be critically damped with damping ratio equal to 1

$$2\omega_I = \frac{K_{P_1}U_c}{L} \Rightarrow K_{P_1} = \frac{4\pi f_s L}{m U_c} \quad (16)$$

Hence with the current loop PI controller of (12) with settings of (15) and (16), the undamped natural frequency of the current loop will be 1/m times the switching frequency and the current loop is critically damped. From (13), if the busbar voltage is well regulated at $U_c$ the dynamics of the current loop is independent of the load current and the supply voltage.

Hence similar design procedures can be applied to the second filter current. If the filter structure is balanced, the same PI controller of (12) can be applied to the second current control loop. With the two added PI controllers and the decoupler, it is able to control the three filter currents $i_{F_1}(t)$, $i_{F_2}(t)$ and $i_{F_3}(t)$.

From (7), if the filter current average DC current $i_{DC}(t)$ is taken as the control input to the shunt filter, the transfer function between the regulated busbar voltage and the average DC current can be written as $$G_v(s) = \frac{V_c(s)}{I_{DC}(s)} = \frac{1}{Cs} \tag{17}$$

Figure 3:
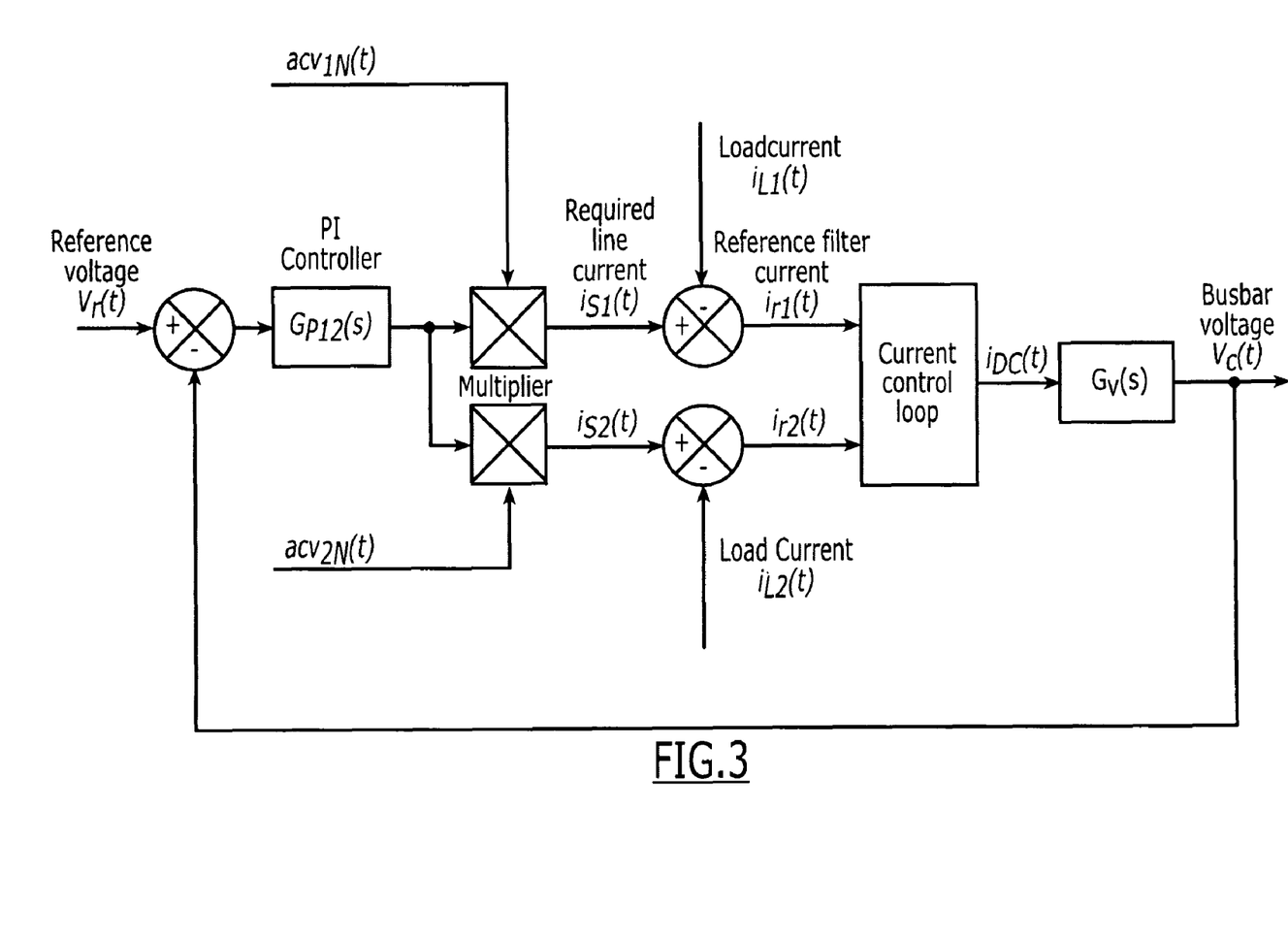
FIG. 3 is a block diagram of the voltage control loop.

The purpose of the voltage control loop is to regulate the DC busbar voltage $v_c(t)$ and to generate reference filter currents to compensate for such that high power factor and low current THD can be achieved. The required filtered current $i_{r_1}(t)$ and $i_{r_2}(t)$ can be obtained by taking the difference between the line currents $i_{s_1}(t), i_{s_2}(t)$ and the load currents $i_{L_1}(t), i_{L_2}(t)$. The reference supply currents $i_{s_1}(t)$ and $i_{s_2}(t)$ can be obtained by introducing a PI controller within the control loop. Consider a PI controller of the form $$G_{PI_2}(s) = K_{P_2} + \frac{K_{I_2}}{s} \tag{18}$$

where $K_{P_2}$ and $K_{I_2}$ are constants, applying to (17) with reference supply currents derived from the phase voltages $v_{1N}(t)$ and $v_{2N}(t)$, the block diagram of the voltage control loop is shown in FIG. 3 where α is a constant. If the supply voltages are balanced, the reference currents generated will also be balanced. If the active power filter could force the supply currents to follow the reference currents, load balancing can be achieved.

The setting of α is to make sure that the output of the analogue multiplier will not saturate. If the magnitudes of $\alpha V_{1N}(t)$ and $\alpha V_{2N}(t)$ are set to unity, the maximum steady state gain from the PI controller output $w(t)$ to $i_{DC}(t)$ is 1.5. The transfer function between the reference voltage $v_r(t)$ and the DC busbar voltage $v_c(t)$ can be approximated as $$V_c(s) = \frac{1.5 G_{PI_2}(s) G_v(s)}{1 + 1.5 G_{PI_2}(s) G_v(s)} V_r(s) \tag{19}$$

where $V_r(s)$ is the Laplace transform of the reference voltage $v_r(t)$ and $V_c(s)$ is the Laplace transform of the DC busbar voltage $v_c(t)$ respectively. The purpose of the PI controller here is to regulate the DC busbar voltage and to generate reference supply currents for the shunt filter which is derived from the supply line voltages $v_{1N}(t)$ and $v_{2N}(t)$. The supply voltages $v_{1N}(t)$ and $v_{2N}(t)$ and load currents $i_{L_1}(t)$ and $i_{L_2}(t)$ will compose of frequency component of the supply frequency, its higher harmonics and may be a DC component. To reduce their effects on the busbar DC voltage and to have a smooth steady state PI controller output, the bandwidth of the voltage loop has to be very much less than the supply frequency such that the fundamental frequency and its higher harmonics of the current reference are substantially attenuated by the voltage control loop. If the steady state PI controller output is smooth, the generated supply current references will have small THD and in phase with the supply voltages. If the bandwidth of the voltage loop is too high, the disturbances will be reflected on the busbar voltage and as a result on the generated supply current references. The supply current references will be corrupted by higher harmonics. The voltage loop characteristic equation is given by $$\Delta(s) = Cs^2 + 1.5 K_{P_2} s + 1.5 K_{I_2} \tag{20}$$

with undamped natural frequency $$\omega_n = \sqrt{\frac{1.5 K_{I_2}}{C}} \tag{21}$$

and the damping ratio ζ governed by $$2\zeta\omega_n = \frac{1.5 K_{P_2}}{C} \tag{22}$$

or $$\zeta = \frac{1.5 K_{P_2}}{2 \omega_n C}$$

Clearly the undamped natural frequency $\omega_n$ is independent of the load current. If the bandwidth of the voltage loop is set to 1/n times the supply frequency $f_v$, the integral gain $K_{I_2}$ becomes $$K_{I_2} = \frac{(2\pi)^2 f_v^2 C}{1.5 n^2} \tag{23}$$

If the damping ratio of the voltage loop is set to one, the proportional gain $K_{P_2}$ becomes $$K_{P_2} = \frac{4\pi f_v C}{1.5 n} \tag{24}$$

An experimental shunt active filter had been built with L=120 μH, C=940 μF, nominal supply voltage was 380 Vrms and the supply frequency was $f_v$=50 Hz. The busbar D.C. voltage was set to $U_c$=700V. Notice that the setting of $U_c$ had to be larger than the differences between line voltages and α was set to 0.0032 such that the peak value of $\alpha v_{1N}(t)$ was 1V. The setting of α was to make sure that the multiplier output would not be easily saturated. The switching frequency was set to $f_s$=20 kHz and the undamped natural frequency of the current loop was set to ⅕ of the switching frequency with m=5. From (15), $$K_{I_1} = \frac{(2\pi f_s)^2 L}{m^2 U_c} = \frac{(2\pi)^2 \times 20000^2 \times 120 \times 10^{-6}}{5^2 \times 700} = 108.3$$

If the damping ratio of the current loop was set to 1, from (16)

$$K_{P_2} = \frac{4\pi f_s L}{m U_c} = \frac{4\pi \times 20000 \times 120 \times 10^{-6}}{5 \times 700} = 0.0086$$

and current loop PI controller of (12) became $$G_{PI_2}(s) = 0.0086 + \frac{108.3}{s}$$

For the voltage control loop, the bandwidth was set to 1/10 of the supply frequency $f_v$ and the proportional gain and integral gain from (23) and (24) were given by $$K_{P_2} = \frac{4\pi f_v C}{1.5n} = \frac{4\pi \times 50 \times 940 \times 10^{-6}}{1.5 \times 10} = 0.0394$$

and $$K_{I_2} = \frac{(2\pi f_v)^2 C}{1.5n^2} = \frac{(2\pi \times 50)^2 \times 940 \times 10^{-6}}{1.5 \times 10^2} = 0.6185$$

The voltage loop PI controller of (18) became $$G_{PI_1} = 0.0394 + \frac{0.6185}{s}$$

Figure 4:
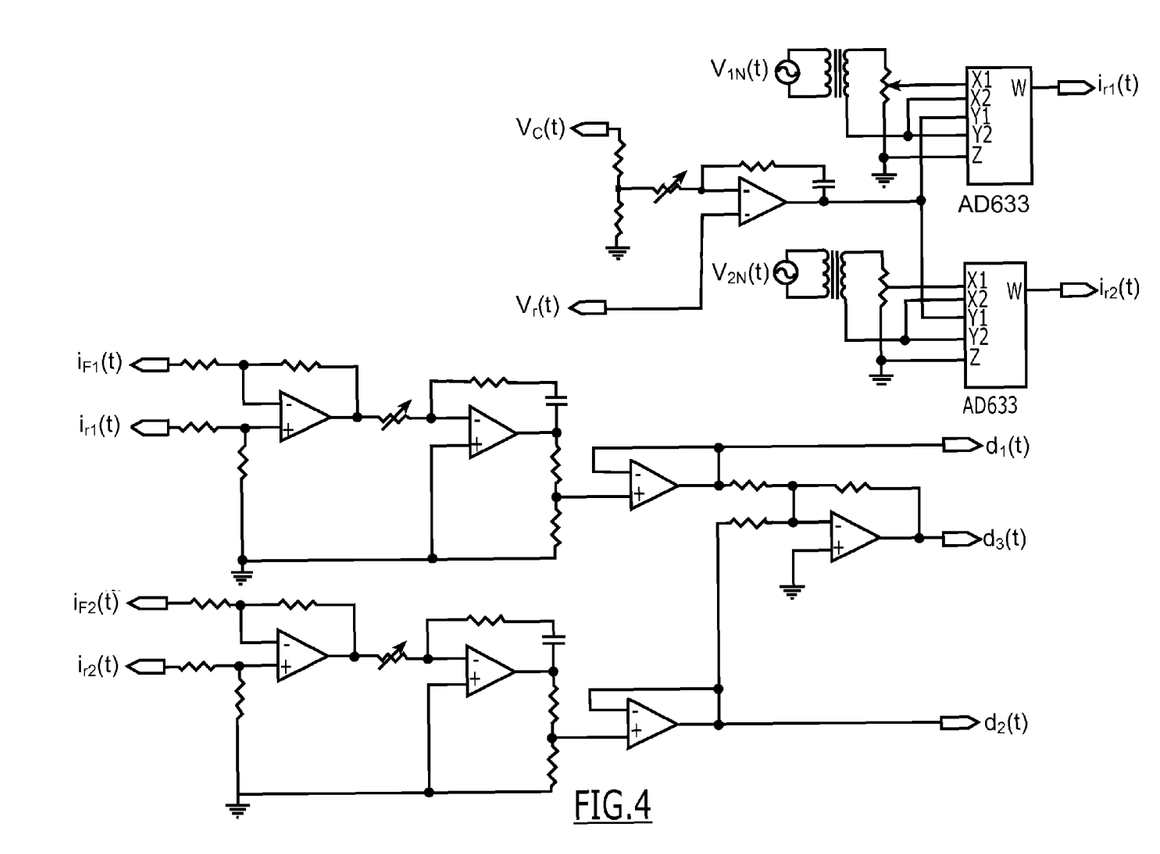
FIG. 4 is a hardware implementation of a decoupled device and cascade controller embodiment of the present invention.

The hardware implementation of the decoupled device and cascade controller is shown in FIG. 4.

EXAMPLE

To demonstrate the performance of the filter under different working conditions, different loading conditions were tested.

Figure 5:
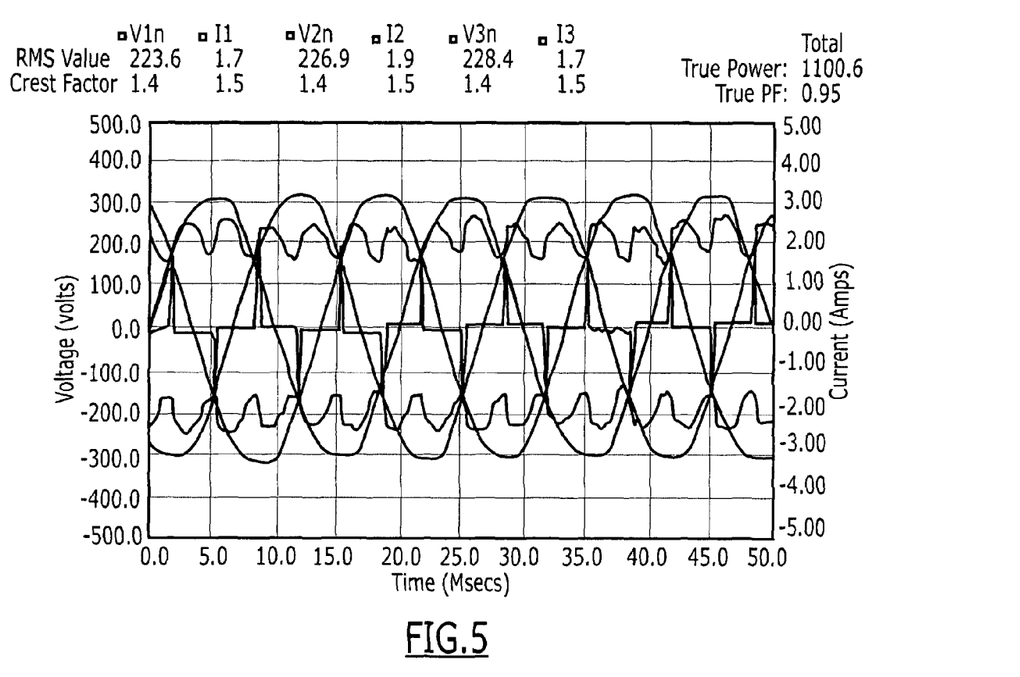
FIG. 5 shows the original voltage and current waveforms prior to the application of the filter.
Figure 6A:
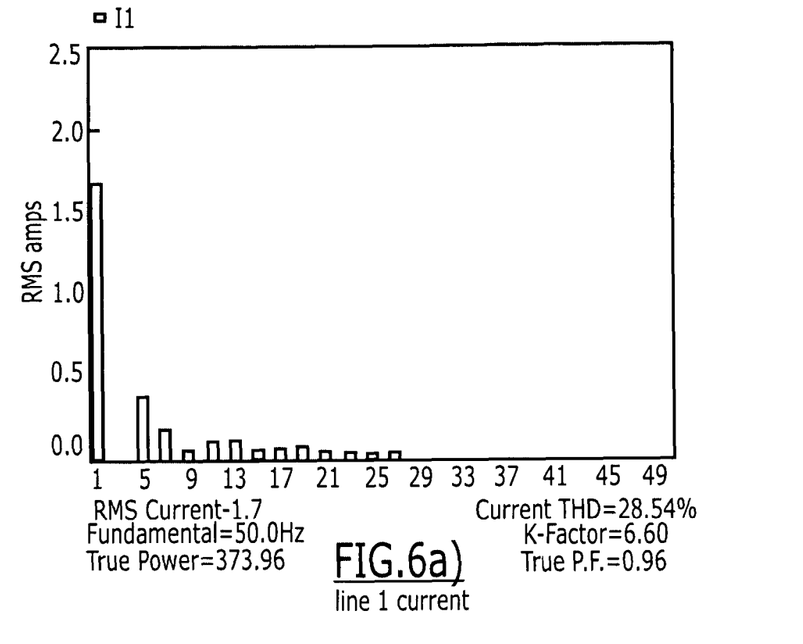
FIG. 6 shows the spectra of the original waveforms.
Figure 6B:
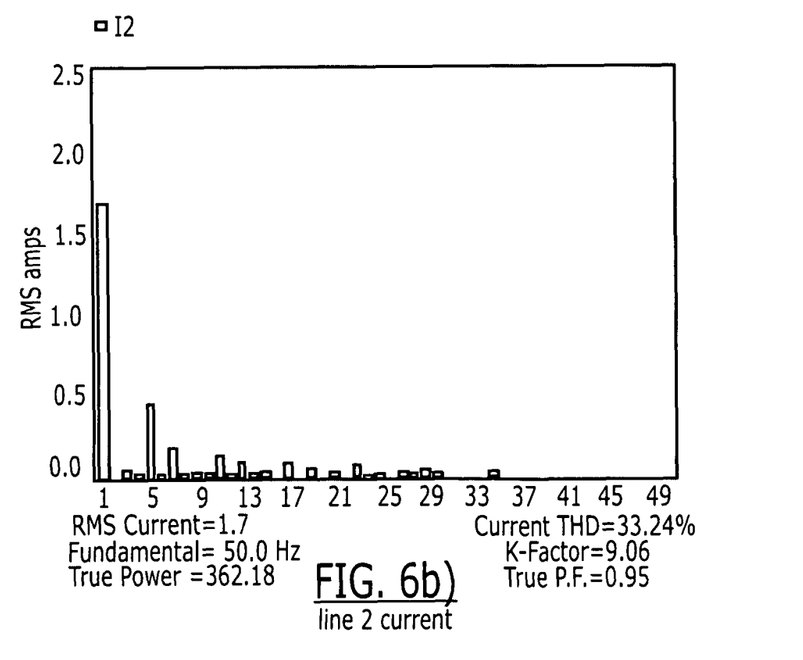
Figure 6C:
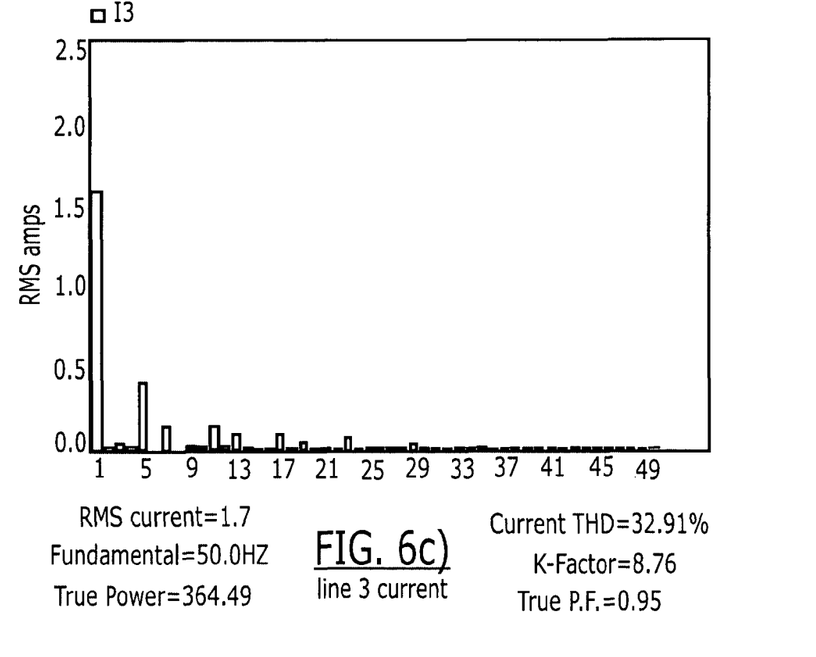
Figure 7:
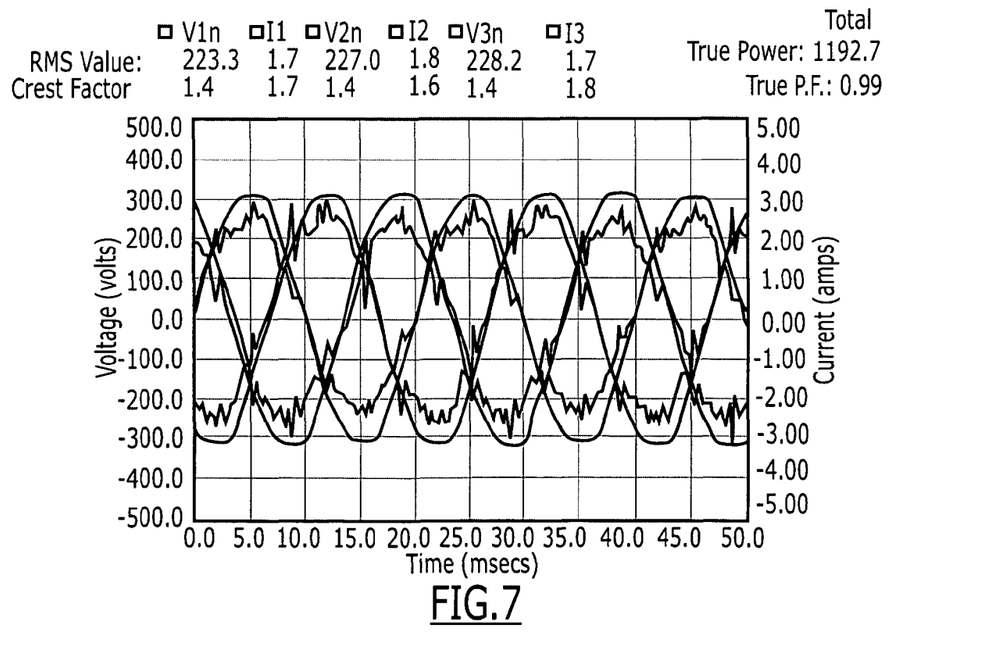
FIG. 7 shows the effects to the implement when the proposed active filter is added.
Figure 8A:
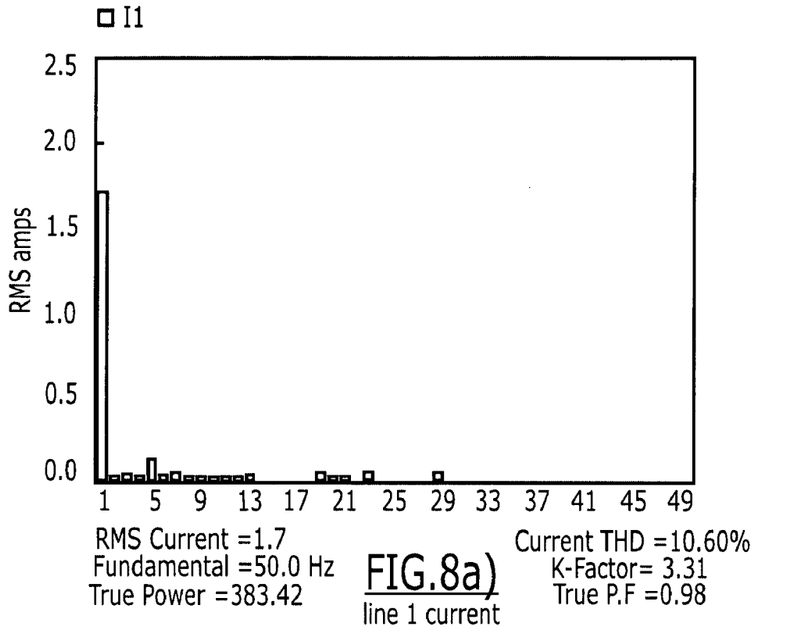
Figure 8B:
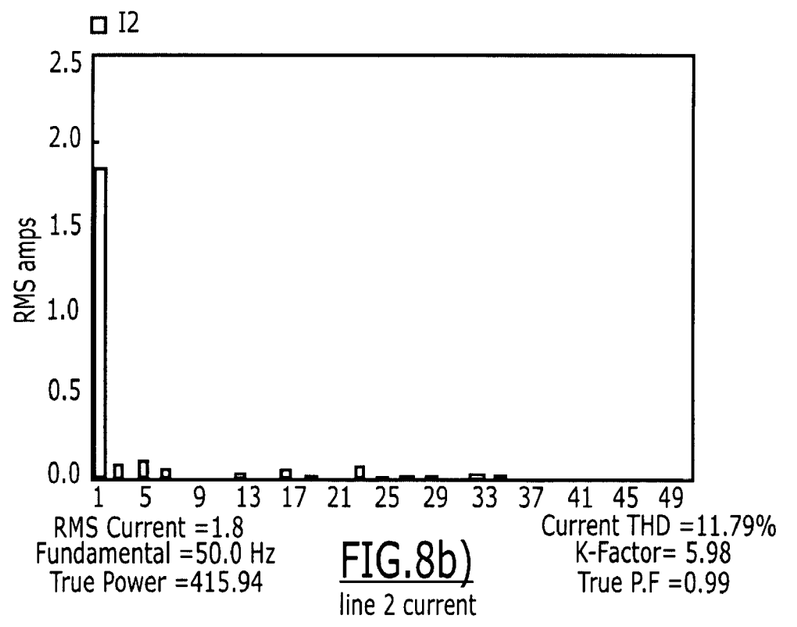
Figure 8C:
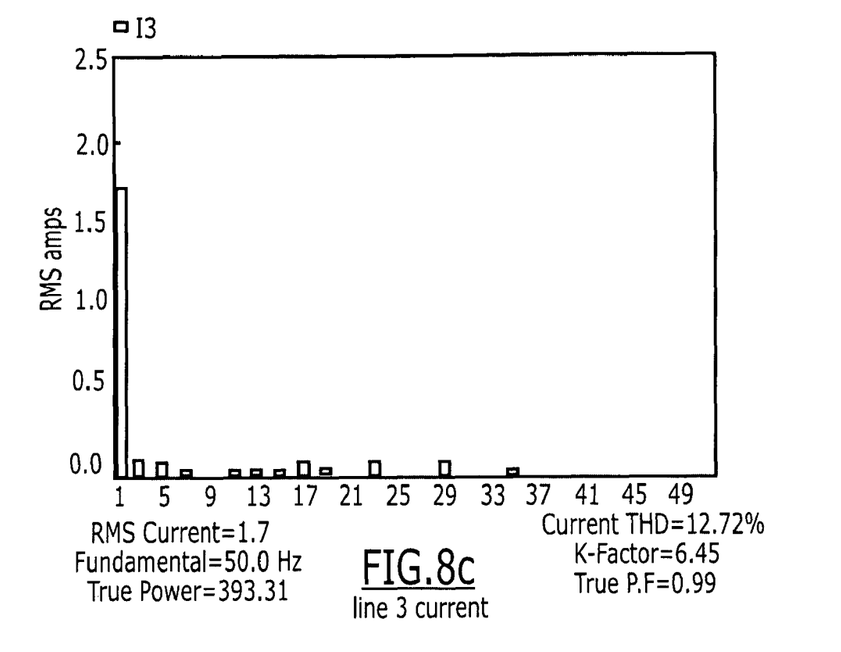

A common nonlinear load was AC to DC conversion using full bridge rectifying circuit. The nominal supply voltage was 380 Vrms. FIG. 5 shows the supply voltage and load current waveforms obtained from the PowerSight Energy Analyzer PS3000. The overall power factor was 0.95, the current magnitude on each line was 1.7 A and the total power consumed was 1100.6 W. The load current spectra are shown in FIG. 6. Clearly there were a lot of $5^{th}$, $7^{th}$ etc. high order harmonics and the current THD on each line were 28.54%, 33.24% and 32.91%. When the active filter was introduced, clearly there was an improvement in the power factor and the current THD. FIG. 7 shows the effects when the proposed active filter was added. The magnitude of supply currents remained as around 1.7 A. The overall power factor increased to 0.99 and the total power consumed was 1192.7 W. The efficiency of the filter was 92.3% in this case. FIG. 8 shows the spectra of the supply currents. Clearly the high order harmonics had been reduced and the current THD for the three lines became 10.6%, 11.79% and 12.72%.

Figure 9:
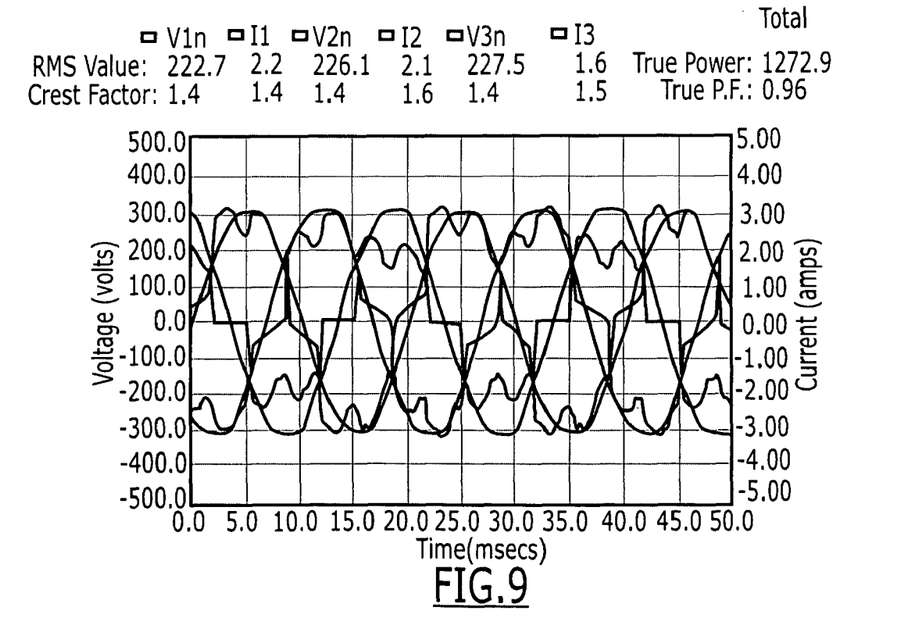
FIG. 9 shows the supply voltage and load current waveforms for an unbalanced load.
Figure 10A:
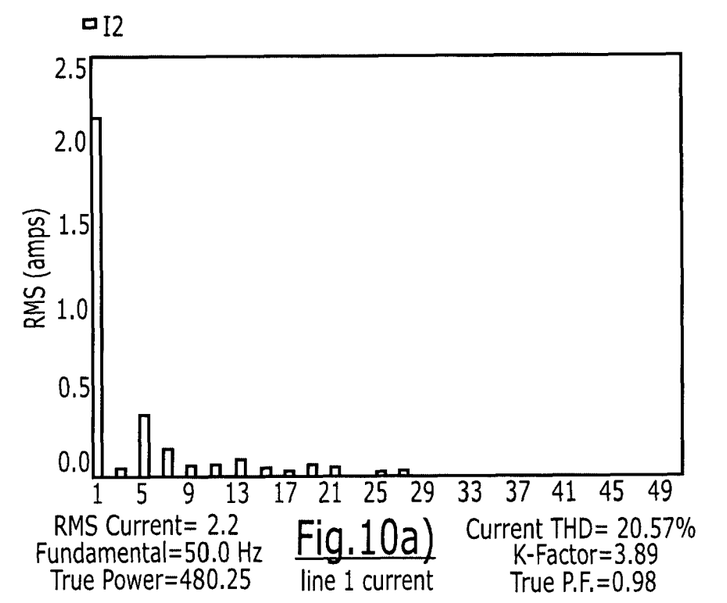
Figure 10B:
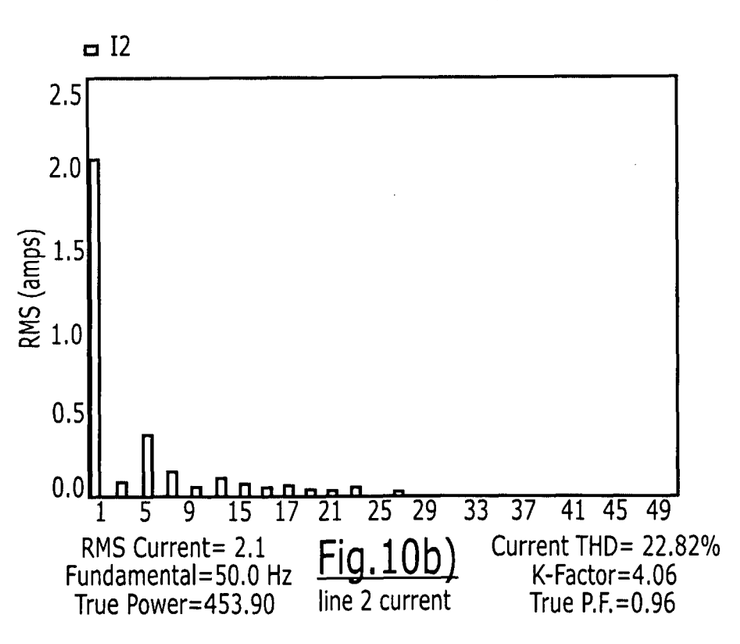
Figure 10C:
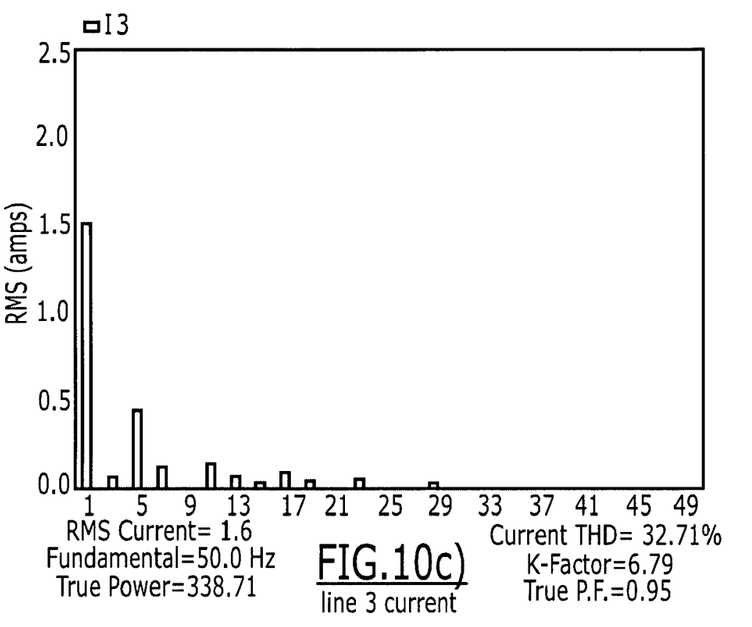
Figure 11:
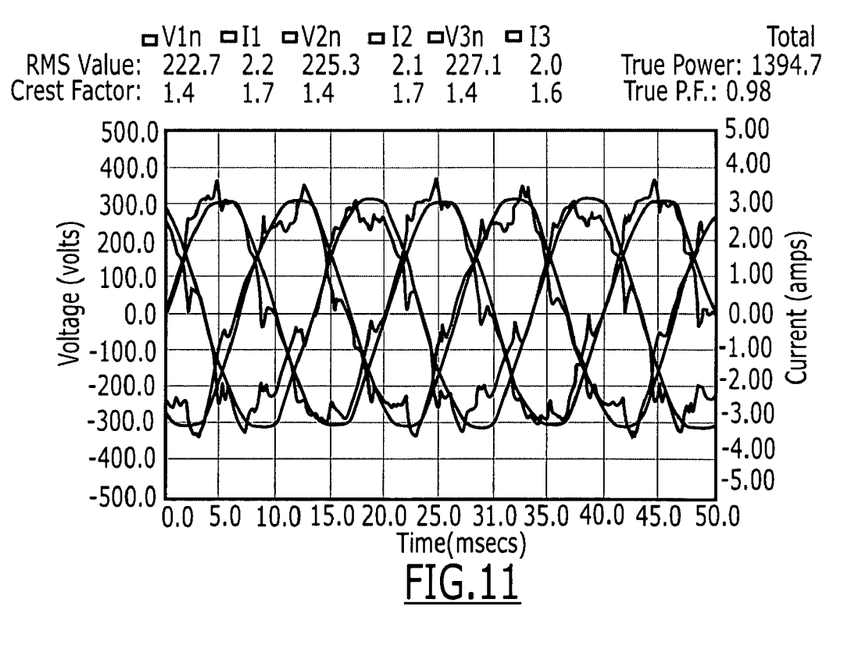
FIG. 11 shows the effects when the present active filter is added.
Figure 12A:
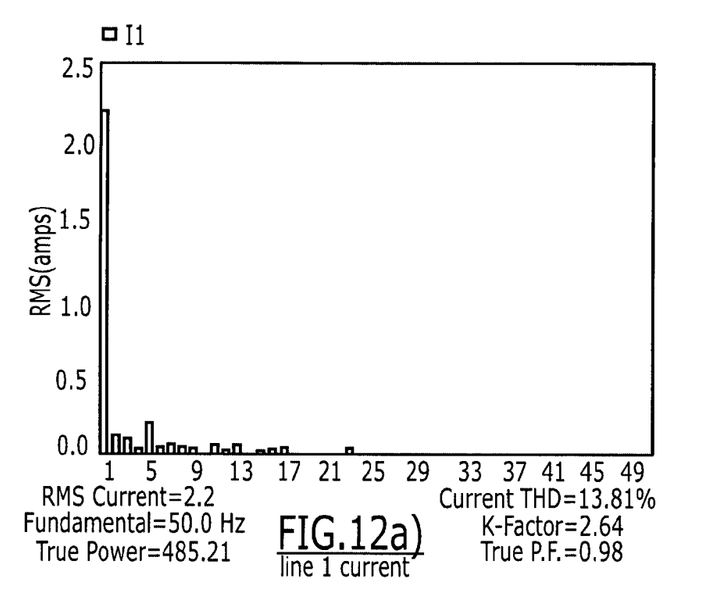
Figure 12B:
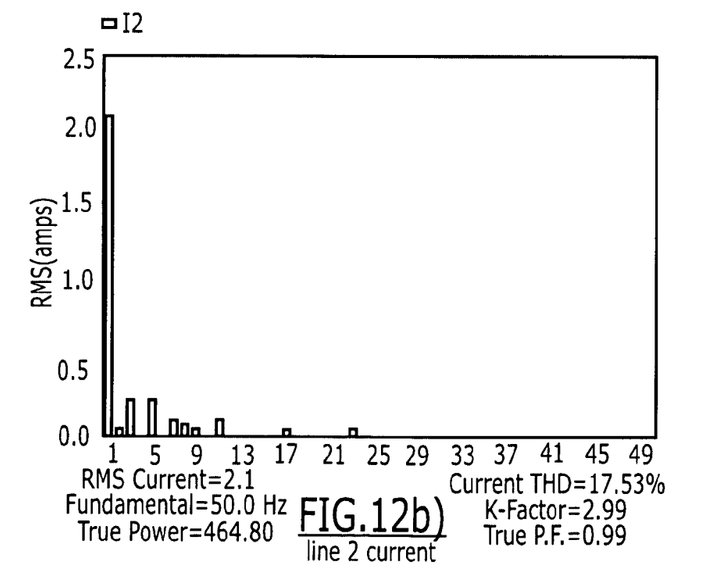
Figure 12C:
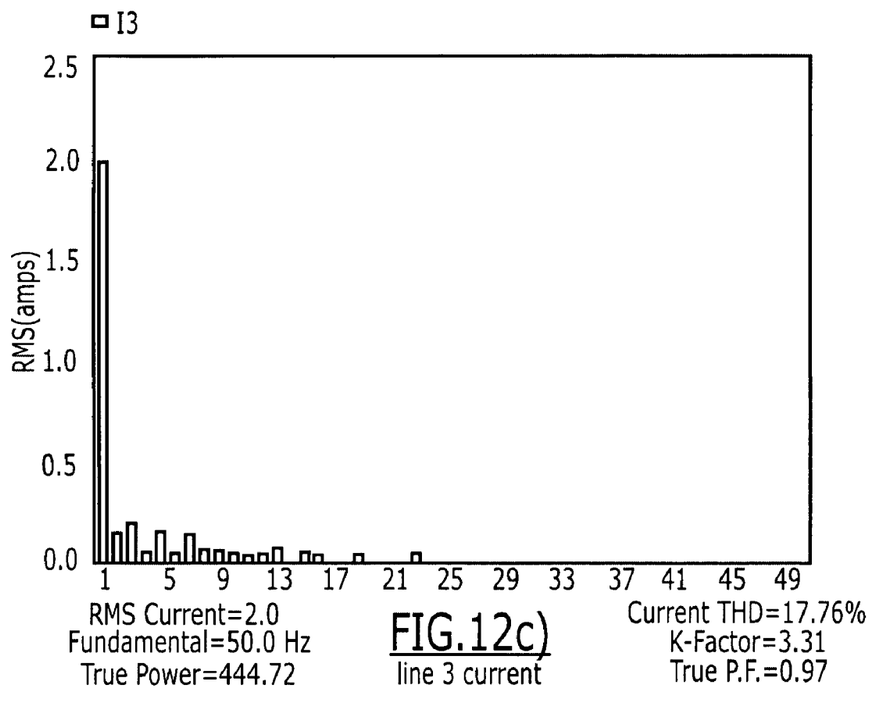

Unbalanced load was also tested. FIG. 9 shows the supply voltage and load current waveforms for an unbalanced load. The magnitude of line currents were 2.2 A, 2.1 A and 1.6 A. The power factor was 0.96 and the power consumed was 1272.9 W. FIG. 10 shows the spectra of the load current. The current THD were 20.57%, 22.82% and 32.71%. When the active filter was introduced, there was an improvement in the power factor, the current THD and the distribution of the line current. FIG. 11 shows the effects when the proposed active filter was added. The magnitude of supply currents became more balanced as they were 2.2 A, 2.1 A and 2.0 A. The overall power factor increased to 0.98 and the total power consumed was 1394.7 W. The efficiency of the filter was 91.3% in this case. FIG. 12 shows the spectra of the supply currents. Clearly the high order harmonics had been reduced and the current THD for the three lines became 13.81%, 17.53% and 17.76%.

All experimental results demonstrated the effectiveness of the proposed active filter in harmonic reduction, power factor correction and load balancing.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. An analog three-phase active power filter with power factor correction, harmonic load reduction, and load balancing, comprising:

a voltage control loop configured to receive a reference voltage and a direct current busbar voltage and two line voltages $V_{1N}(t)$ and $V_{2N}(t)$, and generate a first and second reference line currents based on the two line voltages;

a first current control loop is configured to receive a load current $i_{L1}(t)$, the first reference line current and a filter current $i_{F1}(t)$, and output a duty ratio $U_1(t)$, or receive the first reference line current and a first line current, and output a duty ratio $U_1(t)$;

a second current control loop is configured to receive a load current $i_{L2}(t)$, the second reference line current and a filter current $i_{F2}(t)$, and output a duty ratio $U_2(t)$, or receive the second reference line current and a second line current, and output a duty ratio $U_2(t)$, wherein the first and second current control loops are inside of the voltage control loop, and the first and second current control loops having two PI controllers, the two PI controllers are configured to receive the first and second reference line currents from the voltage control loop and generate two PI controller outputs $U_1(t)$ and $U_2(t)$; and a pseudo inverse decoupling circuit, within the first and second current control loops, configured to receive the PI controller outputs $U_1(t)$ and $U_2(t)$ from the two PI controllers, and outputs a third duty ratio $U_3(t)$.

2. A method of controlling an analog three-phase active power filter with power factor correction, harmonic load reduction, and load balancing, the method comprising:

receiving, by a voltage control loop, a reference voltage and a direct current busbar voltage and two line voltages $V_{1N}(t)$ and $V_{2N}(t)$, and generating a first and second reference line currents based on the two line voltages;

receiving, by a first and second current control loops, a first and second reference line currents, a first and second load currents, a first and second line currents;

receiving, by two PI controllers of the first and second current control loops, the first and second reference line currents from the voltage control loop and generate a first and second duty ratios $U_1(t)$ and $U_2(t)$; and receiving, by a pseudo inverse decoupling circuit, the first and second duty ratios $U_1(t)$ and $U_2(t)$ from the two PI controllers, and outputs a third duty ratio $U_3(t)$, wherein the first and second current control loops are inside of the voltage control loop.

* * * * *